Figure 1:
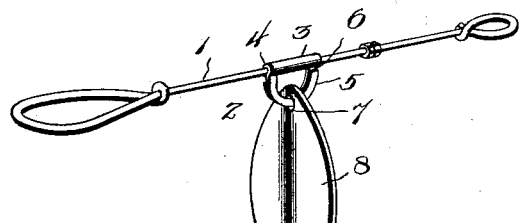

No. 713,435. Patented Nov. 11, 1902.
J. J. HILDEBRANDT.
SPOON CARRIER FOR FISHING TACKLE.
(Application filed May 28, 1902.)
(No Model.)

Witnesses
T. L. Mockler
J. P. Hinkel

John J. Hildebrandt
Inventor
by L. Deane Rose
Attorneys

UNITED STATES PATENT OFFICE.

JOHN J. HILDEBRANDT, OF LOGANSPORT, INDIANA.

SPOON-CARRIER FOR FISHING-TACKLE.

SPECIFICATION forming part of Letters Patent No. 713,435, dated November 11, 1902.

Application filed May 28, 1902. Serial No. 109,330. (No model.)

*To all whom it may concern:*

Be it known that I, JOHN J. HILDEBRANDT, a citizen of the United States, residing at Logansport, in the county of Cass and State of Indiana, have invited certain new and useful Improvements in Spoon-Carriers for Fishing-Tackle, of which the following is a specification.

This invention relates to fishing-tackle, and has special reference to that type of artificial bait involving the employment of a revolving spoon or spoons ordinarily used in connection with what is commonly termed the "trolling-bait."

To this end the invention has specially in view the provision of a simple and practical form of spoon-carrier, sometimes termed the "spoon-carrying lug," and affording a means of connection between the spoon and the bait-stem, while at the same time permitting of the perfectly free back and forth and revolving motion of the spoon as the bait is drawn through the water. In carrying out this object the invention is intended to provide a novel form of spoon-carrier or spoon-holding lug which provides a thoroughly practical detachable connection between the spoon and bait-stem. In other words, the invention permits the spoon to be readily attached or taken off and any desired size of spoon replaced, as the requirements of the fisherman may demand. Also the detachable mounting provided for by the spoon carrier or lug permits the ready substitution of a new spoon in the event of an old one becoming bent or twisted. Also the invention provides a spoon carrier or lug sliding and turning smoothly on the bait-stem and having an extended bearing insuring these results.

With these and many other objects in view, which will more readily appear as the nature of the invention is better understood, the same consists in the novel construction, combination, and arrangement of parts, as will be hereinafter more fully described, illustrated, and claimed.

In carrying out the thought of providing for the detachable mounting of the spoon for the purposes indicated the invention is necessarily susceptible to considerable modification; but for illustrative purposes there is shown in the drawings certain preferred embodiments of the invention.

Figure 2:
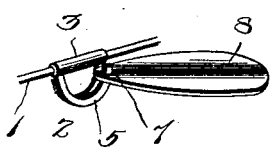
Figure 3:
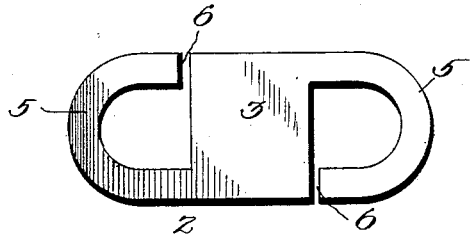
Figure 4:
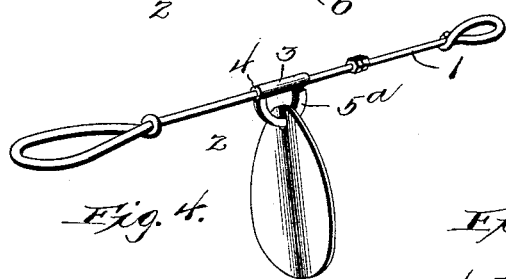
Figure 5:
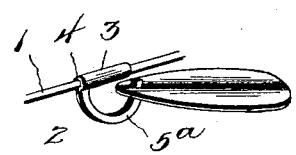
Figure 6:
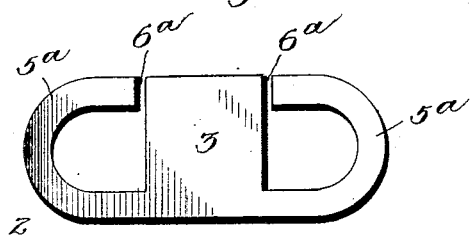

In the drawings, Figure is a detail in perspective of a section of a bait stem or shaft equipped with a spoon carrier or lug embodying the present invention and showing the form of carrier which may be designated as of the "key-ring" type. Fig. 2 is a detail in perspective of the same form of the invention, showing more plainly the manner of engaging and disengaging the spoon. Fig. 3 is a detail plan view of the blank from which the form illustrated in Figs. 1 and 2 is constructed. Figs. 4, 5, and 6 are a group of figures similar to Figs. 1, 2, and 3, but illustrating a modified form of spoon carrier or lug.

Like numerals of reference designate corresponding parts throughout the several figures of the drawings.

The present invention may be utilized with any form of trolling-bait employing the usual spoon, and as the invention simply has reference to the manner of connecting the spoons with the bait-stem there is only shown in the drawings for illustrative purposes a bait-stem section 1, to which the line and hook may be connected in any of the well-known ways.

The present invention contemplates mounting upon the stem or shaft 1 a spoon carrier or lug, (designated in its entirety by the numeral 2.) In all forms of the invention this spoon-carrier is formed from a single metal blank cut and bent to provide the necessary elements for effecting a mounting of the carrier upon the stem and for the detachable connection of the spoon with the carrier, and while different kinds of material may be obviously employed in constructing the carrier, still the most practical construction has been found to be made from a sheet-metal blank having sufficient resiliency to admit of a ready engagement and disengagement of the spoon in the act of fitting the same to the carrier or disconnecting it therefrom.

The spoon-carrier blank or body 2 is formed with a central widened sleeve portion 3, which is bent or crimped into a cylindrical tubular shape to provide an elongated bearing-sleeve 4, which loosely encircles the stem 1 and provides an extended bearing for the carrier thereon. In constructing the body of the spoon-carrier from the single blank the same is formed at opposite sides or edges of the central sleeve portion 3 with the oppositely-disposed keeper-loops 5, preferably in the form of approximately U-shaped hooks having their entrance-openings 6 disposed in proximity to the edge of the sleeve portion 3, from which the loops are projected. When the sleeve portion 3 is bent into the cylindrical bearing-sleeve 4, the body of the blank is necessarily folded upon itself, thereby bringing the opposite loops into substantially parallel relation side by side, and in the preferred form of the invention (shown in Figs. 1 to 3, inclusive, of the drawings) the hook-shaped loops 5 are reversely related—that is, their entrance-openings 6 are disposed, respectively, at opposite ends of the sleeve portion 3—thereby producing a holding-loop for the spoon, which may be properly characterized as of the "key-ring" type. In this construction the eye 7 of the spoon 8 is first engaged in the entrance-opening 6 of one loop, then passed between the loops to the entrance-opening 6 of the other loops and engaged over the latter before it can be completely mounted upon the carrier. This is reversed in taking the spoon off; but it is to be observed that the action is exactly the same as in the use of an ordinary key-ring.

In the modification shown in Figs. 4 to 6, inclusive, of the drawings the keeper-loops (designated by the reference character 5ª) have their entrance-openings 6ª disposed at the same end of the sleeve portion 3, so that when the blank is folded upon itself there is but a single entrance-opening at one end of the carrier, through which the eye of the spoon is passed in engaging and disengaging the same with the carrier. In this latter construction, if found desirable, the entrance-opening for the hook-shaped loops may be temporarily closed by a solder or other equivalent closer.

From the foregoing it is thought that the construction and many advantages of the herein-described spoon-carrier will be readily apparent to those skilled in the art without further description, and it will also be understood that various changes in the form, proportion, and minor details of construction may be resorted to without departing from the spirit of the invention or sacrificing any of the advantages thereof.

Having thus described the invention, what is claimed, and desired to be secured by Letters Patent, is—

1. A spoon-carrier of the class described consisting of a central sleeve portion bent to provide an elongated cylindrical tubular bearing-sleeve for the stem, and means carried thereby for permitting of the detachable mounting of the spoon.

2. A spoon-carrier of the class described consisting of a central sleeve portion bent to provide an elongated cylindrical tubular bearing-sleeve for the stem, and separate hook-shaped keeper-loops projected from opposite edges of the sleeve portion and lying side by side.

3. A spoon-carrier of the class described comprising a central sleeve portion bent to provide a cylindrical tubular bearing-sleeve for the stem, and separate hook-shaped keeper-loops projected from opposite edges of the sleeve portion and reversely related with their entrance-openings disposed at opposite ends of the sleeve.

In testimony whereof I affix my signature in presence of two witnesses.

JOHN J. HILDEBRANDT.

Witnesses:
 FRANCIS C. SWADENER,
 GEORGE KRAMER.